United States Patent [19]

Nusser et al.

[11] 3,754,844

[45] Aug. 28, 1973

[54] PUMP AND ELECTRIC DRIVE MOTOR UNIT

[75] Inventors: Herman Nusser, Asperg, Germany; Hendricus van Eeden, Johannesburg, South Africa; Jürgen Ebert, Stuttgart, Germany

[73] Assignee: Robert Bosch GmbH, Stuttgart, Germany

[22] Filed: July 27, 1972

[21] Appl. No.: 275,574

[30] Foreign Application Priority Data
Aug. 24, 1971  Germany............... P 21 42 257.1

[52] U.S. Cl.............. 417/423 R, 310/43, 310/87
[51] Int. Cl............................................. F04b 17/00
[58] Field of Search................. 417/423; 310/43, 310/87

[56] References Cited
UNITED STATES PATENTS

| | | | |
|---|---|---|---|
| 2,713,627 | 7/1955 | Kamataris | 417/423 R |
| 2,824,520 | 2/1958 | Bartels | 417/423 R |
| 2,993,449 | 7/1961 | Harland | 417/423 R |
| 3,022,935 | 2/1962 | Frost | 417/423 R |
| 3,060,335 | 10/1962 | Greenwald | 417/423 R |
| 3,259,072 | 7/1966 | Carpenter | 415/143 |
| 3,592,566 | 7/1971 | Beardslee | 417/423 R |
| 3,658,444 | 4/1972 | Rhodes et al. | 417/423 R |
| 3,666,381 | 5/1972 | Ulm et al. | 417/423 R |
| 3,667,870 | 6/1972 | Yoshida et al. | 417/423 R |

Primary Examiner—C. J. Husar
Attorney—Edwin E. Greigg

[57] ABSTRACT

There is described a pump assembly which, in a unitary structure, comprises a pump proper and an electric pump drive motor, both contained in a common housing. The pump housing which is disposed within the common housing, has a bearing tube in which journals a shaft carrying the pump impeller and, spaced therefrom, a bell-shaped motor armature surrounding a substantial portion of the bearing tube.

9 Claims, 1 Drawing Figure

Patented Aug. 28, 1973  3,754,844
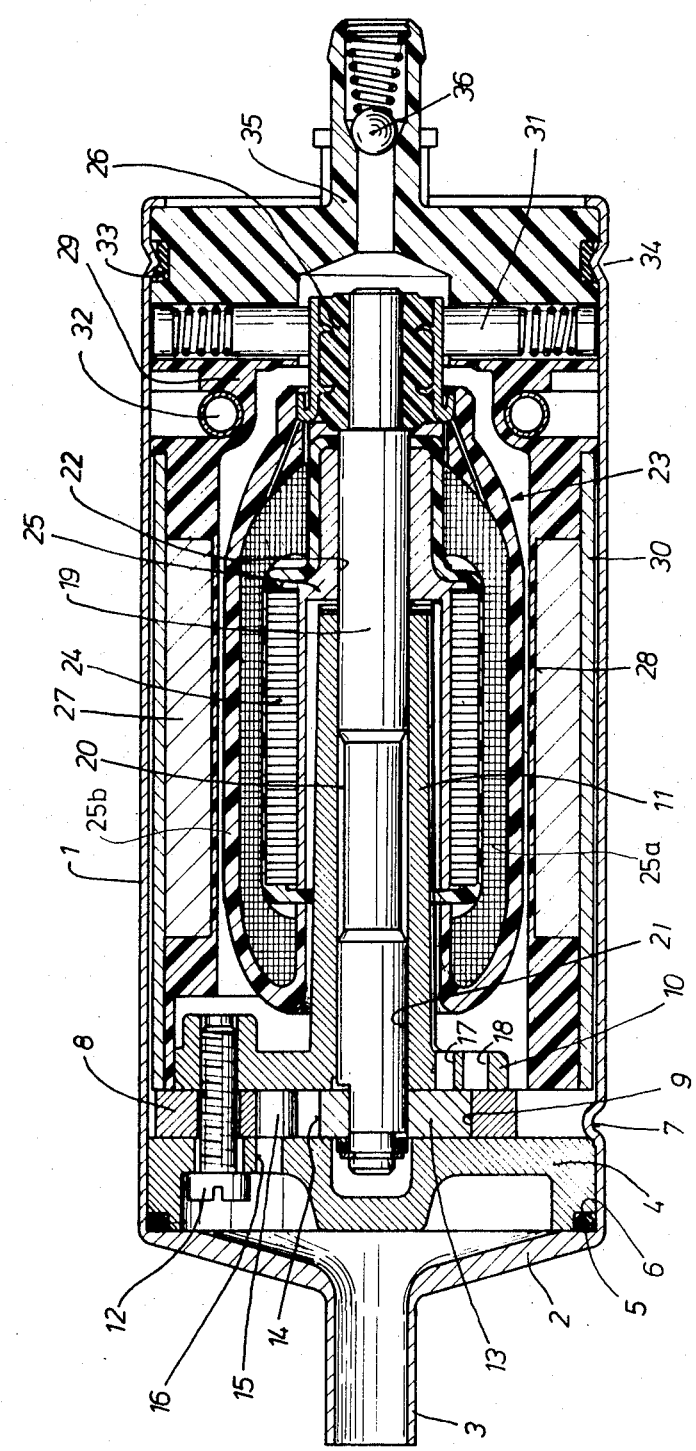

3,754,844

PUMP AND ELECTRIC DRIVE MOTOR UNIT

BACKGROUND OF THE INVENTION

This invention relates to a pump structure, particularly a fuel delivery pump including, in a unitary assembly, a pump proper and an electromotor and having a housing which is filled with the flow medium. The rotary armature of the electromotor is submerged in the flow medium which also serves as a lubricant for the bearings of the rotary components.

A pump of the aforenoted type, as disclosed, for example, in U.S. Pat. No. 3,259,072, comprises a housing which is made of a synthetic material and which is formed of a plurality of cylinders in an end-to-end arrangement. The electromotor is located in the cylindrical main portion of the housing. One side of the latter is bounded by a closure which contains the electric terminals and the support for the carbon brushes. To the other end of the housing there is attached the pump housing which is also made of a synthetic material and which has a diameter greater than that of the motor housing. The pump housing accommodates a centrifugal pump and has an inlet port and an outlet port. The motor chamber is filled with the flow medium of intermediate pressure through particular ports provided in the separating wall between the motor chamber and the pump chamber for lubricating the bearings and cooling the armature of the motor.

In the manufacture of the aforeoutlined pump, synthetic material is used to a significant extent. Since synthetic materials in general have only low strength values that are far below of those of metallic parts, the components of this pump have to be of very substantial thickness resulting in a very bulky overall structure.

OBJECT, SUMMARY AND ADVANTAGES OF THE INVENTION

It is an object of the invention to provide an improved fuel delivery pump of the aforenoted type which is of greatly reduced size despite an extensive use of parts made of synthetic material.

Briefly stated, according to the invention the pump component of the fuel delivery pump comprises a base plate, an intermediate plate and a bearing plate in a stacked relationship. The intermediate plate has an opening which serves as a pump work chamber and in which rotates an impeller keyed to a shaft. The latter journals in a bearing tube which is an integral part of the bearing plate. The electromotor includes an armature which is keyed to said shaft and which surrounds the bearing tube in a bell-like manner. The entire fuel delivery pump is surrounded by an external housing of very simple, preferably rotationally symmetrical configuration.

The aforeoutlined structure has the advantage that those parts of the pump which are exposed to substantial wear are made of materials which have particularly wear-resisting properties. All other components which are not or which are only slightly exposed to wear, may be made of easily workable materails of much lesser strength, such as synthetic materials. Since the latter components are supported by the metal parts of the pump component and by the external housing and since they do not, themselves, have a supporting function, they may be relatively thin-walled. Consequently, the fuel delivery pump according to the invention has a structure of substantially reduced dimensions despite the fact that it is made preponderantly (particularly the very expensive shaped parts) of synthetic material. The metallic parts, due to their simple form, may be made of sintered materials.

The invention will be better understood as well as further objects and advantages become more apparent from the ensuing detailed specification of a preferred, although exemplary embodiment, taken in conjunction with the sole FIGURE which shows the invention in longitudinal section.

DESCRIPTION OF THE PREFERRED EMBODIMENT

The fuel delivery pump is formed of two principal components: an electromotor and a pump proper. The two components are surrounded by an external cylindrical housing 1 having a funnel-shaped end 2 continuing in an outwardly extending inlet nipple 3.

Within the housing 1 there is disposed, in engagement with its funnel-shaped end 2, a bowl-shaped base plate 4, the hollow side of which is oriented towards the inlet nipple 3. For sealing the inner space of the fuel delivery pump, between the base plate 4 and the wall of the external housing 1 there is disposed a rubber packing ring 5 which nests in an annular circumferential groove 6 of the base plate 4. The latter is fixedly held in the external housing 1 by means of indentations 7 (only one visible) provided circumferentially therein.

On the base plate 4 there is positioned an intermediate plate 8 which contains an opening serving as a pump work chamber 9 and a bearing plate 10 in engagement with the intermediate plate 8. The latter, at its side oriented away from the intermediate plate 8, carries a bearing tube 11. The base plate 4, the intermediate plate 8 and the bearing plate 10 are tightened to one another by means of bolts 12 (only one shown) to form a fluid-tight housing of the pump component. The head of each bolt 12 is oriented towards the inlet opening 3.

The pump work chamber 9 has a cylindrical inner wall which is slightly eccentric with respect to the axis of the bearing tube 11. Within the pump chamber 9 concentrically with the axis of the bearing tube 11 there is disposed a pump rotor 13, the diameter of which is so designed that at one side it almost contacts the wall of the pump work chamber 9 to be in a fluid-tight relationship therewith. In this manner a crescent-shaped delivery chamber is formed. In radial slots 14 (only one shown) of the pump rotor 13 there are provided rollers 15 (only one shown) which divide the delivery chamber into individual cells. The latter, upon the rotation of the pump rotor 13, alternately expand and contract in a known manner. The suction side of the pump is in communication with the inlet nipple 3 through a port 16 provided in the base plate 4. The pressure side of the pump is in communication with the motor chamber of the fuel delivery pump through bores 17 and 18 provided in the bearing plate 10.

The pump rotor 13 is fixedly secured to a flattened end of a shaft 19 journalling in the bearing tube 11.

The shaft 19 has, within the bearing tube 11, a length portion 20 of reduced diameter. Thus, the length portion 20 is flanked by two bearing zones 21 and 22 one disposed at each end of the bearing tube 11.

To that end portion of the shaft 19 which is remote from the pump rotor 13, there is affixed an armature 23 of the electromotor. The armature 23 has a bell shape and extends over a substantial portion of the bearing tube 11.

The armature 23 comprises a core member which is formed of a sleeve-shaped support 25 and a stack of sheet metal discs 24 concentrically secured thereto. The core 24, 25 carries an armature coil 25a. Along its length where it carries the stack 24, the support 25 has an enlarged bore to surround the bearing tube 11 with a clearance. At its narrower bore portion, the support 25 is force-fitted on the shaft 19 together with a collector 26.

The entire armature 23 and the collector 26 are surrounded by a coherent sprayed-on envelope 25b consisting of a synthetic material.

The electromotor further comprises a plurality of stationary permanent magnets 27 disposed in depressions of a tubular support structure 29 which is made of synthetic material and which surrounds the armature 23 in a tubular manner. As it may be observed from the FIGURE, the permanent magnets 27 are entirely isolated from the motor chamber by the support structure 29. This arrangement is advantageous in that fragments from the usually very brittle material of which the permanent magnets 27 are made cannot fall into the motor chamber where they could cause jamming of the rotary components. The support structure 29 is secured against rotation in the external housing 1. A sheet metal tube 30 made of magnetically conductive material is inserted with a force fit over the support structure 29.

The support structure 29 also accommodates the carbon brushes 31 contacting the collector 26, suppressor chokes 32 and all components required for conducting the electric current.

At its end remote from the funnel-shaped terminal portion 2, the fuel delivery pump is closed by a lid-like part of the support structure 29 which is provided with an annular groove to receive a sealing ring 33. The latter is engaged by a circumferential restriction 34 of the external housing 1. The support structure 29 is positioned on the pump component 4, 8, 10 and is maintained thereon with a slight pressure by virtue of a radially inwardly crimped terminal edge portion of the extertrl housing 1. The lid-like part of the support structure 29 has an outwardly extending outlet nipple 34 which contains a check valve 36. At its end remote from the outlet nipple 35, the support structure 29 is fitted with a slight tension over the pump component 4, 8, 10.

The flow medium is drawn by the pump component from the inlet nipple 3 and forced through the bores 17, 18 in the bearing plate 10 into the motor chamber. By virtue of this liquid flow the armature 23 is cooled and at the same time the bearing faces 21 and 22 of the shaft 19 within the bearing tube 11 are lubricated. Subsequently, the liquid flows past the collector 26 and leaves the fuel delivery pump through the outlet nipple 35.

What is claimed is:
1. A pump unit comprising
   A. an external housing having an inlet opening and an outlet opening,
   B. a pump housing contained in said external housing and formed of
      1. a base plate,
      2. an intermediate plate and
      3. a bearing plate, all said plates being in a stacked relationship,
   C. a pump work chamber provided in said pump housing,
   D. a bearing tube affixed to said bearing plate and extending outwardly and away from said pump housing,
   E. a shaft journalling in said bearing tube and projecting beyond both ends thereof,
   F. a pump impeller situated in said pump work chamber and affixed to one end of said shaft and
   G. a bell-shaped motor armature affixed to said shaft beyond the end of said bearing tube remote from said pump housing, said motor armature surrounding a substantial length portion of said bearing tube and being exposed to the flow of liquid medium through said pump unit.

2. A pump unit as defined in claim 1, said motor armature comprising
   A. a sleeve-shaped support having
      1. a first portion fixedly secured to said shaft beyond the end of said bearing tube remote from said pump housing,
      2. a second portion integral with said first portion and surrounding said bearing tube with a clearance,
   B. a stack of sheet metal discs carried on said second portion of said sleeve-shaped support,
   C. a coil carried on said sleeve-shaped support and surrounding said stack of sheet metal discs,
   D. a collector affixed to said shaft adjacent said first portion of said sleeve-shaped support and
   E. a coherent envelope of synthetic material encasing said coil and at least one part of said collector.

3. A pump unit as defined in claim 1, said shaft having
   A. a first length portion extending within said bearing tube and having a reduced diameter to provide a clearance between said bearing tube and said shaft along said first length portion,
   B. a second length portion extending from said first length portion to one end of said bearing tube and constituting a bearing face in sliding engagement with said bearing tube and
   C. a third length portion extending from said first length portion to the other end of said bearing tube and constituting a bearing face in sliding engagement with said bearing tube.

4. A pump unit as defined in claim 1, including
   A. a tubular support structure made of synthetic material and surrounding said armature with a clearance, said tubular support structure having a plurality of circumferentially arranged depressions on its outer face,
   B. a plurality of permanent magnets forming part of said motor and nesting in said depressions and
   C. a tubular metal member made of a magnetically conductive material and tightly surrounding said tubular support structure, said tubular metal member and said tubular support structure being disposed in said external housing.

5. A pump unit as defined in claim 1, including an inlet nipple formed as an integral part of said external housing.

6. A pump unit as defined in claim 4, including an outlet nipple formed as an integral part of said tubular support structure and projecting outwardly from said external housing.

7. A pump unit as defined in claim 6, including a check valve situated in said outlet nipple.

8. A pump unit as defined in claim 1, said external housing having a rotationally symmetrical configuration; said base plate, said intermediate plate and said bearing plate having a circular outline.

9. A pump unit as defined in claim 1, at least said base plate and said intermediate plate being made of sintered steel.

* * * * *